United States Patent [19]

Ruprechter

[11] Patent Number: 4,884,749
[45] Date of Patent: Dec. 5, 1989

[54] SPRINKLER STAND, PARTICULARLY FOR NONLEVEL GROUND

[75] Inventor: Adam Ruprechter, Voitsberg, Austria

[73] Assignee: Fa. Rohren- und Pumpenwerk Rudolf Bauer Aktiengesellschaft, Voitsberg, Austria

[21] Appl. No.: 211,204

[22] Filed: Jun. 24, 1988

[30] Foreign Application Priority Data

Jun. 26, 1987 [AT] Austria .................................. 1629/87

[51] Int. Cl.[4] .............................................. B05B 15/06
[52] U.S. Cl. .................................. 239/280.5; 248/184; 248/188.5; 248/292.1
[58] Field of Search ..................... 239/273, 280, 280.5, 239/283, 587, 588; 248/80–88, 184, 185, 292.1

[56] References Cited

U.S. PATENT DOCUMENTS

| 454,156 | 6/1891 | Dillon | 248/292.1 |
| 790,850 | 6/1905 | Pfeiffer | 248/184 |
| 1,553,853 | 9/1925 | Farley | 248/86 |
| 1,674,493 | 6/1928 | Adams | 248/168 |
| 1,959,886 | 5/1934 | Wadsworth | 239/280.5 |
| 2,467,254 | 4/1949 | Carlson | 248/184 |

Primary Examiner—Andres Kashnikow
Assistant Examiner—Patrick N. Burkhart
Attorney, Agent, or Firm—Herbert Dubno

[57] ABSTRACT

The sprinkler stand which supports a sprinkler satisfactorily on nonlevel ground comprises a swingable mount carrying the sprinkler pivotally mounted in the sprinkler stand. The sprinkler is connected with a flexible water feed hose. The swingable mount is equipped with a downwardly pointing balancing device provided with variable weights which acts to orient the sprinkler by the force of gravity.

9 Claims, 3 Drawing Sheets

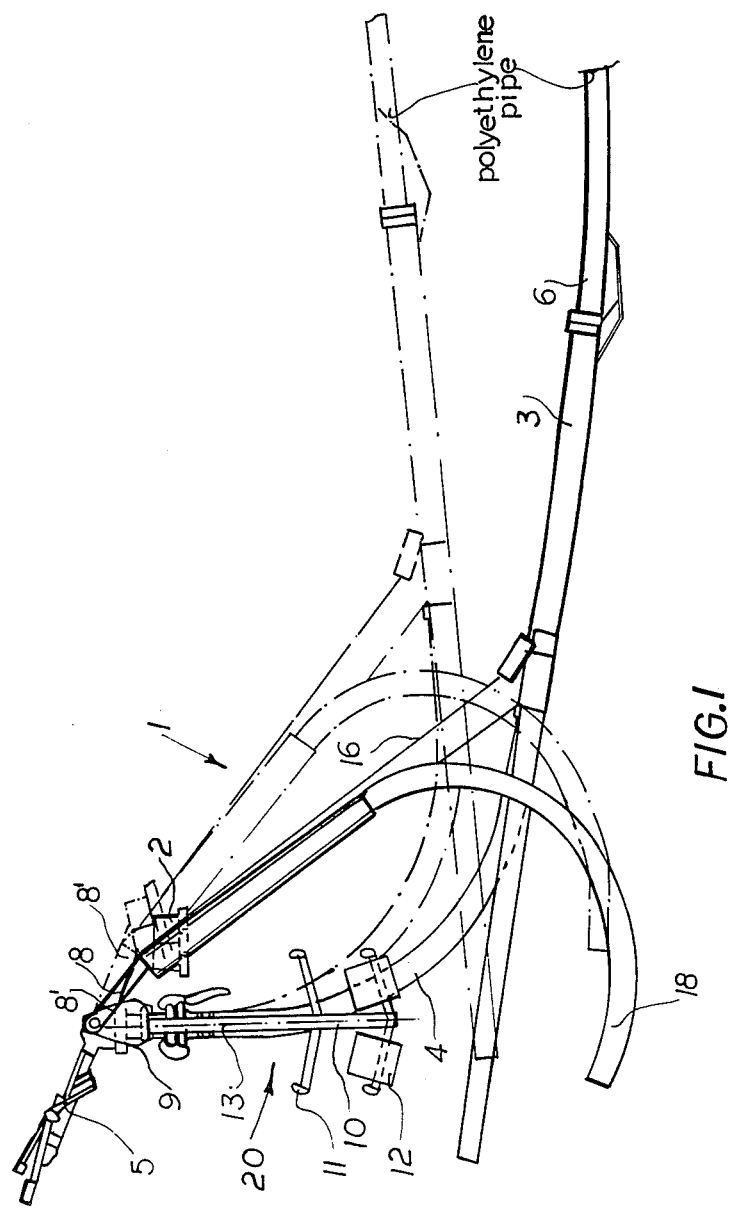

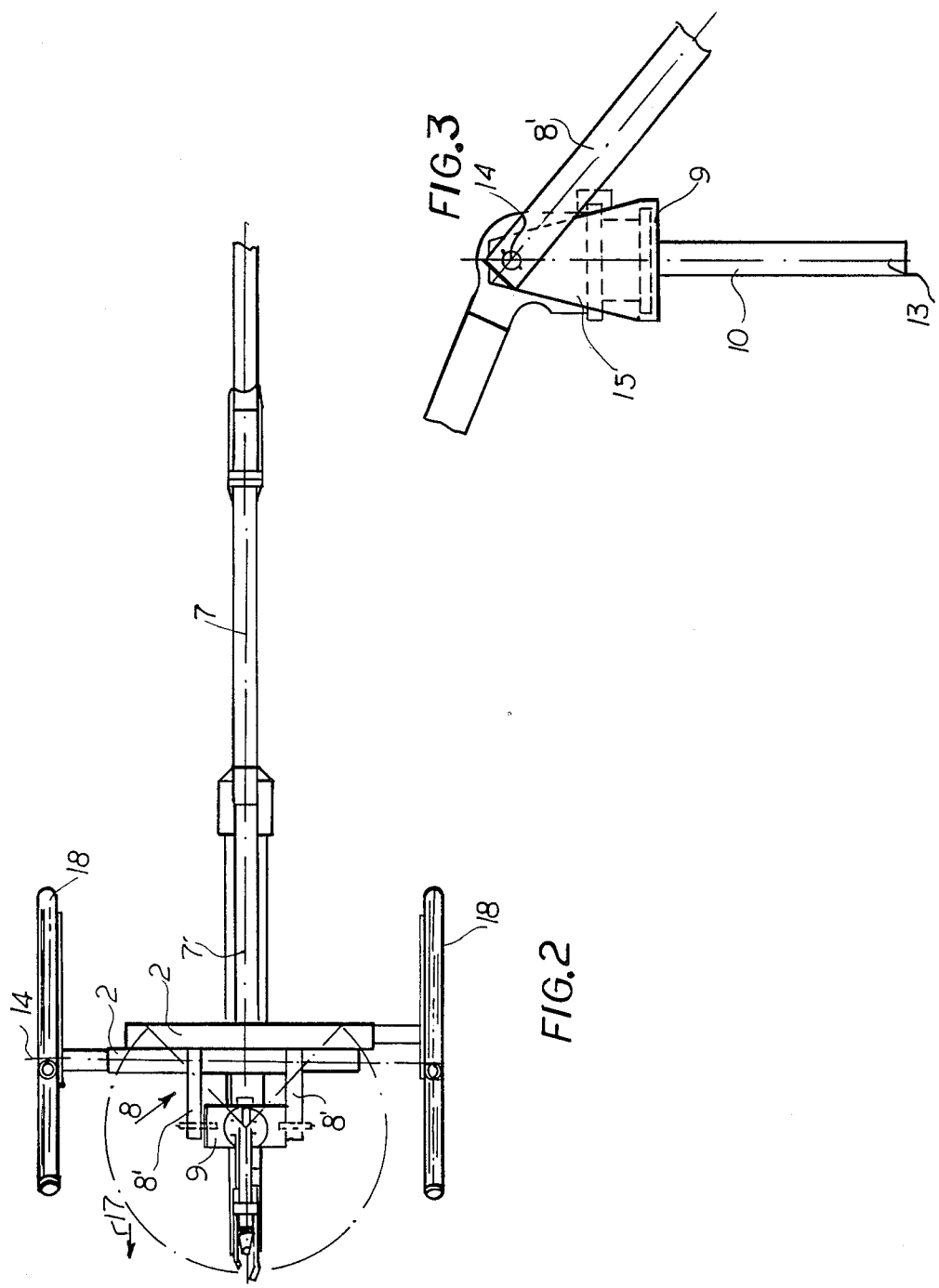

SPRINKLER STAND, PARTICULARLY FOR NONLEVEL GROUND

FIELD OF THE INVENTION

My present invention relates to a sprinkler stand carrying a sprinkler which irrigates or waters grass, crops and various plants on agricultural, commercial or residential land.

BACKGROUND OF THE INVENTION

A conventional sprinkler is attached to a sprinkler stand so that, in operation on nonlevel ground or also with its feed pipe elevated, the stand assumes an inclined or slanted position so that the operation of the sprinkler is impaired and an optimum distribution of water is no longer possible. Moreover the sprinkler service life is also affected negatively by this inclined position.

The sprinkler stand described in German Open Patent Application No. 26 43 587 is a sprinkler-drag stand with a rigid vertical pipe or standpipe on whose vertical pipe portion a guide pipe is attached on both sides. The standpipe or vertical pipe includes a vertical portion which is connected to a horizontal sliding and connecting portion to which a hose is attached. This rigid structure similarly tends to assume an inclined position on nonlevel ground. The above mentioned operational impairment is present here as well.

OBJECTS OF THE INVENTION

It is an object of my invention to provide an improved sprinkler stand for a sprinkler which has none of the above mentioned difficulties and/or disadvantages.

It is another object of my invention to provide an improved sprinkler stand for a sprinkler in which the sprinkler axis is held at a constant orientation with respect to the vertical and thus an optimum distribution angle for the sprinkler is guaranteed on nonlevel as well as level ground.

It is a further object of my invention to provide an improved sprinkler stand for a sprinkler with which an optimum distribution of water is obtained even when the sprinkler stand rests on nonlevel o inclined ground.

SUMMARY OF THE INVENTION

These objects and others which will become more readily apparent hereinafter are attained in accordance with my invention in a sprinkler stand carrying a sprinkler.

According to my invention the sprinkler stand comprises a swingable mount carrying the sprinkler pivotally connected to the sprinkler stand. The sprinkler is attached to a flexible water feed hose and the swingable mount is provided with a balancing device having a plurality of variable size (and variably positionable) weights directing forces downwardly which keep the sprinkler properly oriented by the force of gravity.

In one embodiment of my invention the swingable mount can be mounted to pivot about a substantially horizontal pivot axis which is substantially perpendicular to the longitudinal axis of the sprinkler stand.

The swingable mount can comprise a support plate on which the sprinkler is mounted and two pivot arms connected to the support plate in the vicinity of the ends of the support plate directed upwardly for pivotal suspension in the sprinkler stand. The swingable mount can be suspended substantially perpendicular to the sprinkling or feed direction of the sprinkler of the sprinkler stand with each of the pivot arms being pivotally attached to a supporting arm rigidly attached to a crossbar of the sprinkler stand. An additional feature of my invention is that the balancing device can be rigidly attached to the support plate.

Another embodiment of my invention has the swingable mount pivotable in the sprinkler stand also about another substantially horizontal pivot axis substantially parallel to the longitudinal axis of the sprinkler stand. Yet another feature of this embodiment is that a U-shape frame member oriented or pointing in the outflow or sprinkling direction can be mounted on the crossbar and the frame member can be pivotable on the crossbar about a substantially horizontal axis at right angles to the crossbar.

The balancing device can comprise two molded pipes directed downwardly on extensions of the pivot arms. Also according to my invention the balancing device can include a plurality of laterally and upwardly directed barlike holders for receipt of the weights.

The balancing device can advantageously comprise two downwardly directed molded pipes on extensions of the arms and a plurality of barlike holders directed upwardly for receiving the weights.

BRIEF DESCRIPTION OF THE DRAWING

The above and other objects, features and advantages of my invention will become more readily apparent from the following description, reference being made to the accompanying highly diagrammatic drawing in which:

FIG. 1 is a side view of a sprinkler stand with one embodiment of the sprinkler stand according to my invention;

FIG. 2 is a top view of the sprinkler stand of FIG. 1;

FIG. 3 is a detailed side view of a portion of the sprinkler stand shown in FIG. 1;

SPECIFIC DESCRIPTION

Figure 4:
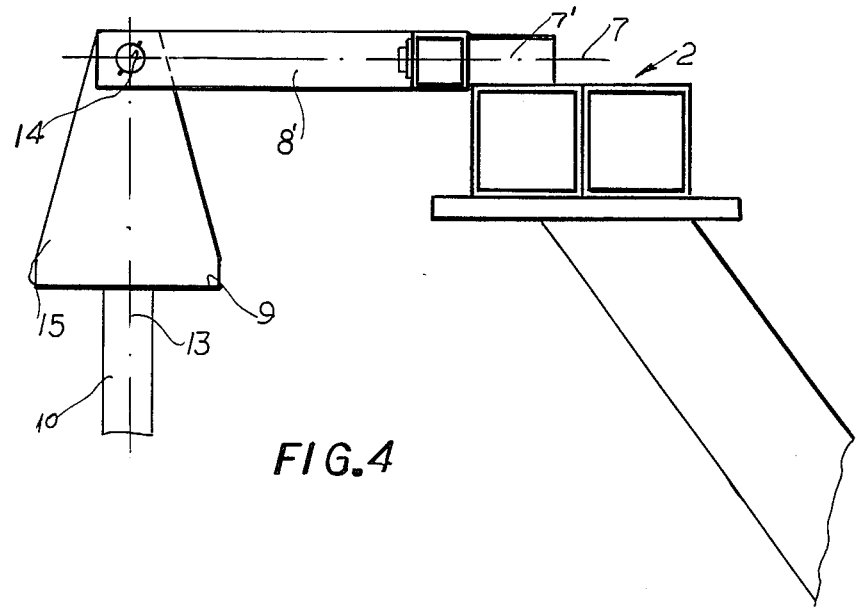
FIG. 4 is a detailed side view of another embodiment of a sprinkler stand according to my invention.

The sprinkler stand 1 comprises two curved stand legs 18 which are attached to one another by a two-part crossbar 2. The crossbar 2 can be extended and/or shortened on both sides by a collapsible or telescoping pipe arrangement so that the stand width or track width of the sprinkler stand 1 can be varied.

The sprinkler stand 1 further comprises a feed pipe 3 held by an inclined brace piece 16. One end of the water feed pipe 3 is connected to a flexible hose 4 which leads to the sprinkler 5 while the other end is connected to a polyethylene pipe 6. The flexible hose 4 can be detachably connected with the sprinkler 5 by a quick-release coupling or can be fixed to the sprinkler. Two supporting pieces extending upwardly in the sprinkling direction 17 from the sprinkler and are positioned symmetrically about the longitudinal axis 7. These supporting pieces form both supporting arms 8' of a U-shape frame member 8.

Both of these supporting pieces are fixed to the crossbar 2. A support plate 9 attached to two substantially vertical pivot arms 15 is pivotally mounted on these supporting arms 8' in the vicinity of the ends of these arms 8'. The substantially horizontal pivot axis 14 of this support plate 9 is substantially parallel to the crossbar 2 but substantially perpendicular to the longitudinal axis 7 of the sprinkler stand and thus allows a swinging motion of the support plate 9 in the longitudinal direction 17.

The sprinkler 5, which is connected at its bottom by a coupling with the flexible hose 4, is mounted on the top of the support plate 9. A balancing device 20 is located under the support plate 9. The balancing device 20 comprises two molded pipes 10 directed downwardly from extensions of the pivot arms 15, to which several barlike holders 11 for weights 12 directed laterally and upwardly (FIG. 1) are attached.

The balancing device 20 can, however, comprise a basket or similar device carrying the weights.

By this arrangement the sprinkler axis 13 is held always substantially vertical to the rolling or nonlevel ground in operation of the sprinkler stand 1. According to the lay of the land, i.e. the characteristics of the terrain, the load weights 12 can be varied. One inclined position of the stand 1 is shown in dot-dash lines in FIG. 1.

So that a balancing can occur also upon development of a laterally inclined position the frame member 8 should be jointedly attached to the crossbar 2. The pivot axis 7' can be located substantially horizontal and perpendicular to the crossbar 2 and advantageously coincident with the longitudinal axis 7 of the stand.

Figure 5:
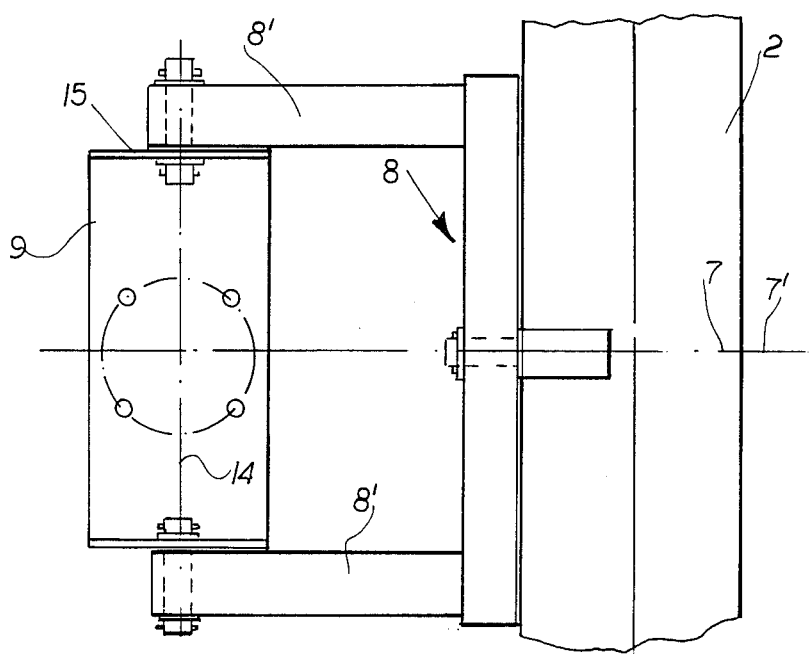
FIG. 5 is a top view of the sprinkler stand shown in FIG. 4.

FIGS. 4 and 5 show a portion of this other embodiment of a sprinkler stand according to my invention. The stand has available another substantially horizontal pivot axis 7' in addition to the above-mentioned substantially horizontal pivot axis 14 for rocking or swinging so that the swingable mount is cardanically mounted or gimballed.

The arrangement of the pivots of the swingable mount and/or the frame member is so chosen that the reaction force arising from the sprinkling action as a result of the positioning of the pivot axes and the lines of action of the forces remains ineffective and thus no oscillating motion occurs in operation. The guiding forces of the curved flexible water feed hose 4 are compensated by increased load weights 12.

I claim:

1. A sprinkler stand for supporting or carrying a sprinkler comprising an swingable mount carrying said sprinkler and pivotally mounted in said sprinkler stand, said sprinkler being attached to a flexible water feed hose, and said swingable mount being provided with a balancing device having a plurality of variable size weights directed downwardly, said swingable mount being mounted to pivot about a substantially horizontal pivot axis which is substantially perpendicular to a longitudinal axis of said sprinkler stand, said swingable mount comprising a support plate on which said sprinkler is mounted and two pivot arms connected to said support plate in the vicinity of the ends of said support plate directed upwardly for pivotal suspension in said sprinkler stand.

2. The sprinkler stand defined in claim 1 wherein said swingable mount is suspended substantially perpendicular to a sprinkler feed direction of movement of said sprinkler stand with said pivot arms from two supporting arms mounted on a crossbar of said sprinkler stand.

3. The sprinkler stand defined in claim 1 wherein said balancing device is rigidly attached to said support plate.

4. The sprinkler stand defined in claim 1 wherein said swingable mount is mounted in said sprinkler stand so as to be pivotable about another substantially horizontal pivot axis substantially parallel to the longitudinal axis of said sprinkler stand.

5. A sprinkler stand for supporting or carrying a sprinkler comprising an swingable mount carrying said sprinkler and pivotally mounted in said sprinkler stand, said sprinkler being attached to a flexible water feed hose, and said swingable mount being provided with a balancing device having a plurality of variable size weights directed downwardly, said swingable mount being mounted to pivot about a substantially horizontal pivot axis which is substantially perpendicular to a longitudinal axis of said sprinkler stand, a U-shape frame member oriented in the longitudinal axis being mounted on a crossbar, said U-shape frame member being pivotable about another substantially horizontal pivot axis at right angles to said crossbar.

6. The sprinkler stand defined in claim 1 wherein said balancing device comprises two molded pipes directed downwardly on extensions of said pivot arms.

7. The sprinkler stand defined in claim 1 wherein said balancing device includes a plurality of laterally and upwardly directed barlike holders for receipt of said weights.

8. A sprinkler stand for supporting or carrying a sprinkler comprising:

a swingable mount including a support plate on which said sprinkle is mounted and two pivot arms connected to said support plate in the vicinity of the ends of said support plate directed upwardly for pivotal suspension in said sprinkler stand, said swingable mount being mounted in said sprinkler stand pivotable about one substantially horizontal pivot axis which is substantially perpendicular to the longitudinal axis of said sprinkler stand and about another substantially horizontal pivot axis substantially parallel to said longitudinal axis of said sprinkler stand, said sprinkler being attached to a flexible water feed hose, and a balancing device comprising two molded pipes downwardly directed from said pivot arms and a plurality of laterally directed barlike holders attached to said molded pipes on which a plurality of variable size weights are mountable.

9. The sprinkler stand defined in claim 8 wherein said swingable mount is suspended substantially perpendicular to the longitudinal axis with said pivot arms from two supporting arms mounted on a crossbar of said sprinkler stand.

* * * * *